United States Patent [19]

Gerace et al.

[11] Patent Number: 5,254,263
[45] Date of Patent: Oct. 19, 1993

[54] METHOD OF MAKING SLUDGE POWDER AND SEALANT FROM PAINT SLUDGE AND SLUDGE POWDER AND SEALANT COMPOSITIONS PRODUCED THEREBY

[75] Inventors: Michael J. Gerace, Dayton; Sevilla C. Gamboa, Huber Heights; Yasminka S. Landaburu, Yellow Springs, all of Ohio

[73] Assignee: Aster, Inc., Yellow Springs, Ohio

[21] Appl. No.: 921,559

[22] Filed: Jul. 29, 1992

Related U.S. Application Data

[63] Continuation-in-part of Ser. No. 763,324, Sep. 20, 1991, Pat. No. 5,160,628.

[51] Int. Cl.$^5$ .............................................. B01D 37/00
[52] U.S. Cl. .................................... 210/667; 210/751; 210/770; 210/806; 34/60
[58] Field of Search ............... 210/751, 770, 806, 206, 210/688, 667; 34/12, 60

[56] References Cited

U.S. PATENT DOCUMENTS

| | | |
|---|---|---|
| 2,152,716 | 4/1939 | Van Wirt et al. . |
| 3,764,013 | 10/1973 | Eisenmann . |
| 3,800,865 | 4/1974 | Onarheim et al. . |
| 3,926,129 | 12/1975 | Wall . |
| 4,100,066 | 7/1978 | Bloomer et al. . |
| 4,193,206 | 3/1980 | Maffet . |
| 4,441,437 | 4/1984 | Moskau . |
| 4,708,775 | 11/1987 | McGregor et al. . |
| 4,750,274 | 6/1988 | Erdman, Jr. et al. . |
| 4,980,030 | 12/1990 | Johnson et al. . |
| 5,087,375 | 2/1992 | Weinwurm . |
| 5,160,628 | 11/1992 | Gerace et al. ............ 210/667 |

FOREIGN PATENT DOCUMENTS 376020  7/1990  European Pat. Off. .

*Primary Examiner*—Frank Spear
*Attorney, Agent, or Firm*—Killworth, Gottman, Hagan & Schaeff

[57] ABSTRACT

A sludge powder and sealant are prepared from paint sludge. A sludge powder is generated from a paint sludge having a volatiles content of 0–50% by weight by adding a processing filler thereto. A sealant composition is prepared by thereafter or concurrently therewith adding sealant ingredients including polymer, plasticizer, curative, and other sealant ingredients such as an adhesion promoter and sealant filler materials to the sludge powder. Alternatively, a sealant composition may be prepared by adding a paint sludge having a volatiles content of 0–50% by weight to the sealant ingredients, which may include a processing filler.

13 Claims, No Drawings

METHOD OF MAKING SLUDGE POWDER AND SEALANT FROM PAINT SLUDGE AND SLUDGE POWDER AND SEALANT COMPOSITIONS PRODUCED THEREBY

CROSS-REFERENCE TO RELATED APPLICATIONS

This is a continuation-in-part of application Ser. No. 763,324, filed Sep. 20, 1991, now U.S. Pat. No. 5,160,628, entitled "Method of Making a Filler from Automotive Paint Sludge, Filler, and Sealant Containing a Filler," the disclosure of which is hereby incorporated by reference.

This invention relates to a method for making a sludge powder and sealant from paint sludge and a sludge powder and a sealant composition made by those methods. More particularly, it involves a method for using a paint sludge as a functional filler in preparing sealant compositions.

BACKGROUND OF THE INVENTION

The treatment of chemical waste is a topic of vital concern to industry and to all those concerned with the environment. Increasingly, governmental regulations are aimed at controlling the type and quantity of waste materials generated by industry because of the potential effect on the environment. As a result, treatment methods which reduce or eliminate chemical waste are of great interest to industry.

The paint and coatings industry is a major source of chemical wastes. Paint sludges are produced in the automotive industry, appliance industry, metal fabricating industry and during the painting of wood products, outdoor structures such as bridges and lamp posts, and all types of industrial equipment. For example, it is estimated that nearly 40% of the 6 gallons of paint used to produce the exterior finish on an automobile ends up as waste. With an estimated 36 million cars built each year (not including light trucks and other vehicles), the waste generated from automobile painting alone approaches one quarter of a billion pounds. If this waste paint could be turned into a useful product, a major source of chemical waste could be reduced or eliminated.

When an automobile is painted on an assembly line, the excess paint is collected beneath the automobile in a trough filled with water. Typically, the waste paint solids are recovered by placing the paint-water mixture into large settling tanks. The paint solids either agglomerate as a raft on the surface of the water, or they sink and accumulate on the bottom of the tank. Other methods for treating the paint-water mixture to remove the paint solids are disclosed in U.S. Pat. Nos. 3,764,013 and 4,100,066. The material recovered from such processes is known as paint sludge.

Paint sludge is very complex material. The paint component contains uncured polymer resins, pigments, curing agents, surfactants, and other minor formulation ingredients. In addition, paint sludge contains water and a variety of organic solvents. The presence of the uncured paint resins, which cure and form a film upon heating, make the sludge very sticky and difficult to handle. Therefore, detackification agents are often added to the sludge.

The detackified paint sludge is usually disposed of without further processing. It is a tackfree, pulpy, putty-like solid having about 25-75% volatiles (water and organic solvent) content. The cost and the environmental impact of disposing of paint sludge in this form make it undesirable.

Recently, a process was developed in which the detackified sludge is converted to a dry powder prior to disposal. The first step of this process, which is disclosed in U.S. Pat. No. 4,980,030, involves removing a portion of the water and liquid hydrocarbons from the sludge. The high solids sludge is then heated to remove the remaining water and hydrocarbons. The heating step is also designed to cure the uncured polymeric paint resins. The process is advantageous because it reduces the volume of waste produced, and the resulting powder is somewhat easier to handle than the wet sludge.

A similar process is disclosed in U.S. Pat. No. 5,087,375, which discloses a method for producing insoluble raw materials from waste. Among the materials which may be so treated is paint sludge. Specifically disclosed is a method of treating, handling, heating and calcining paint sludge. Further, at column 8, lines 52-56 of U.S. Pat. No. 5,087,375, it is indicated that product from the process may be used as a filler for sealants.

However, both U.S. Pat. No. 4,980,030 and U.S. Pat. No. 5,087,375, completely cure any uncured polymers in the paint sludge during their heating and/or calcining steps. Accordingly, the resulting product is an inert, inorganic, hard, abrasive particulate material.

An improvement on the processes disclosed in U.S. Pat. Nos. 4,980,030 and 5,087,375 is found in copending application Ser. No. 763,324. There the product produced, which may be used as a filler in sealant compositions, contains uncured polymer. As explained in that application, keeping the polymer uncured results in a product which is soft and easily dispersible. Further, the uncured polymer in the product renders the resultant filler "functional" with regard to chemical reactivity and binder content. This permits use of the resultant product in sealant formations without the need to add expensive "functional ingredients" which would otherwise have to be added along with the inert fillers.

Still, the process of copending application Ser. No. 763,324 requires certain treatment and processing steps in order to produce a putty or powder filler which is then added to the sealant composition. It would be desirable to minimize or eliminate the need for such steps and have available an in.situ method for using a paint sludge as a functional filler in preparing sealant compositions.

Accordingly, the need remains for a simplified method for making a sealant from paint sludge and for a sealant composition made by that method.

SUMMARY OF THE INVENTION

The present invention solves that need by providing a method for using paint sludge containing water, solvent, and uncured polymer resin in preparing sealant compositions. The paint sludge may be a paint sludge from the automotive industry, appliance industry, metal fabricating industry or other sources. A paint sludge having a volatiles (water and organic solvent) content of 0-50% by weight may be added directly to the sealant ingredients (which may include a processing filler) to prepare a sealant composition; or a sludge powder containing uncured polymer can first be generated from the paint sludge by adding a processing filler and, then, a sealant composition prepared using the sludge powder. The processing filler is preferably selected from the group consisting of calcium oxide, calcium sulfate, calcium chloride, magnesium sulfate, sodium sulfate, potassium carbonate, calcium carbonate, silica, clay, talc, hydrated alumina, wood flour, nut shells, poly soy and cork.

In either event, a paint sludge having a volatiles content of 0-50% is used. Thus, a raw paint sludge having a volatiles content in that range, or a detackified paint sludge having a volatiles content of 25-75% by weight, or a paint sludge treated or a detackified paint sludge further treated to remove a portion of the water to produce a concentrated paint sludge, may be used. Water and solvent can be removed by mechanically drying the raw paint sludge or detackified paint sludge to produce a concentrated paint sludge. The purpose of this is to remove gross water and solvent without altering the composition of the paint sludge. Any physical method of removing the water and solvent, such as filtration, can be used.

While the sludge powder generated by this method may be stored for later use as a functional filler in a sealant composition, preferably it is generated in.situ as a part of the method of preparing the sealant composition. Thus, immediately after the sludge powder containing uncured polymer is generated or at the same time it is being generated, the sealant ingredients may be added. The sealant ingredients are preferably polymers (resins or rubbers), most preferably at least in part a polyvinyl chloride resin; plasticizer; curative, and other sealant ingredients such as an adhesion promoter and sealant filler materials.

Thus, the preferred sealant made with the sludge powder of the present invention is a vinyl plastisol-based one useful as an automobile sealant. A vinyl plastisol is a finely divided polyvinyl chloride (PVC) resin suspended in a plasticizer. The plastisols are liquids which are applied at low temperatures to the substrate. The liquid is converted to a solid through exposure to heat. In effect, the heat causes the suspended resin particles to be fused or dissolved in the plasticizer. A solid product results upon subsequent cooling.

Vinyl plastisols are excellent as sealants over all areas of the automobile body assembly line. They flow readily at room temperature to fill seams and body joints which need to be sealed. They adhere well to oily steel and primed metal surfaces. They can be painted over without leaching or causing other cosmetic problems. Finally, they are durable enough to withstand normal weather and user exposure. Another important quality of the vinyl plastisols is that they are not expensive.

Aside from the above-mentioned PVC resin, plasticizer, and of course the sludge powder, it is also desirable to add a thermoplastic polymer (resin or rubber) such as vinyl acetate ethylene to the sealant formulation in order to impart flexibility to the sealant. Other additives such as thixotropes, heat stabilizers, pigments, other sealant fillers, rubbers, wetting agents, and various combinations and mixtures thereof may be added.

Finally, there is present an adhesion promotion system. The adhesion promotion system preferably contains an unsaturated organosilane, and acrylic monomer, an unsaturated acid or anhydride monomer, an epoxy or modified epoxy resin and a hardening agent for the epoxy resin, such as a polyamide. Such a system is disclosed in U.S. Pat. No. 5,039,768, assigned to the same assignee as the present invention.

Because the paint sludge or sludge powder of the present invention contains uncured polymer, it will cure upon exposure to heat. Therefore, it not only acts as a filler in a sealant formulation but also as a binder. This property is particularly advantageous in an automobile sealant composition with regard to cost reduction and to improve the ability of the wet sealant to withstand the washes and primer applications experiences during the fabrication of car bodies; although, it may also be used in other products. For example, the sludge powder of the present invention may also be used in adhesives, molded or extruded plastic products, and structural composites. Still, a sealant and particularly an automobile sealant made from an automobile paint sludge is most preferred because of the advantages offered to the automobile industry in not only disposing of the automotive paint sludge safely but also turning it into a material useful in a product used by the automobile industry.

Therefore, it is an object of the present invention to provide a method for making a sludge powder and sealant with a paint sludge and to provide a sludge powder and sealant compositions. These and other objects and advantages of the present invention will become apparent to those skilled in the art from a reading of the following detailed description of the preferred embodiments and the appended claims.

DESCRIPTION OF THE PREFERRED EMBODIMENTS

Raw paint sludge from many types of automobile painting operation contain approximately 30% water and 50% volatiles; although the volatiles content of paint sludges in general (i.e. those not only from the automobile industry, but also the appliance industry, the metal fabricating industry, etc.) can vary from 25-75% by weight. For the purposes of the present invention, a volatiles content of approximately 0-50% by weight is desired. If the raw paint sludge from the painting operation has a volatiles content in that range, it may be used raw. Likewise, a detackified paint sludge having a volatiles content of 25-75% may be used. For example, one obtained sample of detackified automobile paint sludge had a volatiles content of about 36% by weight and a water content of about 31% by weight and was used in that form. If the paint sludge used as the starting material has a higher volatiles content, or if a more concentrated sludge is preferred, a portion of the water and solvent can be removed. Thus, gross water and solvent may be removed as long as the composition of the paint sludge is not otherwise affected. Any physical method of removing the water and solvent can be used. Filtration, centrifugation, decantation, pressing, distillation, extraction, freeze drying, and fluidized bed drying are examples of methods for mechanically drying the paint sludge. Filtration is preferred.

Other drying steps may also be used to produce a concentrated sludge. Among the equipment which can be used for this drying step are the following: double planetary mixers, double-arm or sigma blade mixers, kneader-extruders, ribbon blenders, conical screw mixers, and horizontal plow-paddle mixers. A double planetary mixer is preferred. This process may also include mild heating. In this case, it is important that the temperature not exceed 100° F. for more than 60 min. so that the uncured polymer resin in the paint sludge remains uncured.

At this point, the paint sludge (either a raw paint sludge, a detackified paint sludge and/or a concentration sludge) containing approximately 0-50% volatiles content is either blended directly with the sealant ingredients or a sludge powder is formed by adding a processing filler. That processing filler may be a chemical drying agent. Thus, the water in the paint sludge may be reacted with a chemical drying agent which is capable of either consuming the water or converting it to another molecular form. Hydration and hydrolysis are examples of processes which accomplish this result. Anhydrous forms of chemicals suitable for desiccation such as calcium oxide, calcium sulfate, calcium chloride, magnesium sulfate, sodium sulfate, potassium carbonate, may be used in this step. Molecular sieves can also be used. Calcium oxide is preferred. Alternatively, non-drying processing fillers may be used either as a replacement for the drying agent or in combination with a drying agent. Examples include calcium carbonate, silica, clay, talc, hydrated alumina, wood flour, nut (such as Pecan or Walnut) shells, poly soy, and cork. In any event, the amount of processing filler used may range from 10 to 80% by weight of the paint sludge, more preferably 33 to 60% by weight of the paint sludge.

Upon addition of the processing filler to the paint sludge, a sludge powder is generated. That sludge powder can be stored and later used as a functional filler in sealant compositions or additive in other compositions. The sludge powder produced by the present invention acts as a rheology modifier when used as an ingredient in sealants. It can also be used in adhesive compositions. Because of its somewhat polymeric-like nature, it can provide a degree of dilatancy which cannot be achieved with traditional fillers. This allows the adhesive or sealant to be more wash-out resistant during exposure to various cleaning solutions used in the automotive assembly operation.

Most preferably, however, the sludge powder is generated in-situ as a part of the method of preparing a sealant composition. Thus, after the processing filler is added to the paint sludge or concurrently therewith, sealant ingredients are added to the mixture.

With regard to the preferred sealant made with the sludge powder of the present invention, as mentioned, preferably it contains a polyvinyl chloride resin, plasticizers, curative and other sealant ingredients such as an adhesion promoter and sealant filler materials.

Polyvinyl chloride resins used in the compositions of this invention are finely divided resin particles which are capable of being dispersed in a plasticizer. The resins are well known and have been widely used in plastisol compositions. The polyvinyl chloride resins include polymers of vinyl chloride as well as copolymers of vinyl chloride with copolymerizable vinyl addition monomers. Examples of such vinyl addition monomers include vinyl acetate, the vinyl acetals, maleic esters, styrene, vinylidene chloride and acrylonitrile. The particularly preferred polyvinyl chloride resins are the fine particle dispersion type vinyl chloride/vinyl acetate copolymer resins and vinyl chloride/maleic ester copolymers in a monomer weight ratio of vinyl chloride to vinyl ester of from about 99:1 to about 90:10. Blends of several different polyvinyl chloride resins may also be used and will also be referred to as the polyvinyl chloride resin, even though more than one resin may actually be present. A blend of 50-100% and most preferably 50-75% of a copolymer dispersion resin and 0-50% and most preferably 25-50% of a vinyl chloride/maleic ester copolymer blending resin is preferred.

Plasticizers useful in the present invention include monomeric types selected to achieve desired characteristics such as proper gelation, fusion, and flow properties. Examples of such monomeric plasticizers include monomeric esters of phthalic, benzoic, succinic, adipic, sebacic, talic, lauric, azelaic, trimellitic and stearic acids. Specific plasticizers include dioctyl phthalate, ethylene glycol dibenzoate, dioctyl succinate, dibutyl sebacate; dibenzyl azelate; didecyl glutarate and similar compounds. Other monomeric plasticizers include esters of 2,2, 4-trimethyl-1, 3-pentanediol, citric acid esters and n-ethyl toluenesulfonamide. Preferred is disodecyl phthalate.

Polymeric plasticizing agents can be used in conjunction with the monomeric plasticizers in order to achieve special characteristics such as permanence, weathering resistance, and especially paintability. Polymer plasticizers useful in the present invention include the higher molecular weight polymeric acid esters (molecular weights greater than 1000). Examples of these polymeric plasticizers include esters of succinic, adipic, sebacic, talic, lauric, azelaic, caprylic, hexanoic, benzoic, phthalic, phosphoric, oleic, glutaric, trimellitic and stearic acids, including mixtures or blends of these compounds. The polymeric plasticizers have low diffusion rates because of their higher molecular weights and also act to retard the migration of other components from the applied compositions. Additionally, low molecular weight chlorinated paraffinic oils and epoxidized soybean oil can be used as a co-plasticizers. Again, blends of several different plasticizers may be used, but will be referred to simply as the plasticizer.

The sealant may also contain an elastomer component, preferably a thermoplastic polymeric resin or rubber such as vinyl acetate ethylene. Some examples of thermoplastic polymeric resins or rubbers that could be used include ethylene vinyl acetate, vinyl acetate ethylene, vinyl acetate, acrylonitrile, acrylonitrile butadiene copolymer, chlorinated ethylene vinyl acetate, polyepsilon caprolactone, methyl methacrylate and polybutylene terephthalate. An ethylene vinyl acetate having a 20-80% vinyl acetate content is preferred. Vinyl acetate ethylene copolymers having a vinyl acetate content of preferably 50-70% and most preferably 60-65% are highly preferred because of their balance of compatibility, flow, adhesion and flexibility.

The adhesion promotion system used in the sealant formulation preferably contains an unsaturated organosilane; an acrylic monomer; and an unsaturated acid or anhydride monomer. Most preferably it also contains an epoxy resin or modified epoxy resin and a hardening agent for the epoxy resin, such as a polyamide or modified polyamide. All of the unsaturated materials are capable of polymerization with peroxide initiation and heat. The formation of a highly functionalized oligomeric or polymeric modified acrylic species in situ (after heating) in concert with the reacted epoxy resin presumably is what is responsible for the tenacious bonding of the current adhesive to oily metals.

Examples of unsaturated organosilanes are the vinyl, acrylic and methacrylic types such as vinyl trichlorosilane, vinyl triethoxy silane, vinyl trimethoxy silane, vinyl-tris B-methoxy-ethoxy silane, 3-methacryloxypropyl trimethoxy silane. Examples of acrylic monomers are any of the free radical induces polymerizable mono or multifunctional acrylic or methacrylic monomers such as trimethylolpropane trimethacrylate, hexane diol diacrylate, and butyl methacrylate. Examples of unsaturated acid or anhydride monomers are the vinyl, acrylic, and methacrylic mono or poly functional acid or anhydride materials such as maleic, acrylic, crotonic, methacrylic, oleic, linoleic, and tetrahydrophthalic acid or anhydride.

Examples of unmodified epoxy resins are those based on bisphenol-A and epichlorohydrin with typical properties that includes an epoxy value of 152–155 equiv./100g and a weight per epoxide of 182–192. Other typical epoxy resins are phenol novolac, triphenylolmethane, and tetrabromo bis-A. An example of a modified epoxy resin includes the preferred elastomeric modified liquid epoxy resin which is a 40% adduct of carboxylated acrylonitrile butadiene elastomer and a liquid bisphenol-A and epichlorohydrin type epoxy. That adduct has a weight per epoxide of 325–375. Curing for the epoxy or modified epoxy resin is accomplished by reacting the resin with an appropriate curing or hardening agent. Typical hardening agents are polyamides, diethylenetriamine, methane diamine, m-phenylene diamine, diaminodiphenyl sulfone, tris (dimethyl amino methyl) phenol, dicyandiamide, BF3-monoethyl amine and nadicmethyl anhydride. Preferred is a modified polyamide hardening agent such as a latent polyamide dispersion which is an adduct of phthalic anhydride and diethylenetriamine in an unmodified liquid epoxy resin. The epoxy of modified epoxy resin/hardening agent system apparently modifies the galvanized surface by reacting with and/or to the adhesion promotion system in the preferred embodiment.

It has been found that inclusion of the adhesion promotion system in the compositions at the stated level significantly increases the adhesion of the composition to a metal surface without adversely affecting the qualities of the applied composition. That is, the composition's resistance to primer wash, paintability, viscosity stability, etc. are not adversely affected by the adhesion promoter. Other adhesion promoters are also preferably used with the current materials and, again, reference to the adhesion promoter is reference to the adhesion promoter system unless otherwise indicated.

Optional components of the composition of the invention comprise additives such as rubbers, waxes, heat stabilizers, other fillers, pigments, and wetting agents. Such components are readily available. Amorphous waxes, carnauba wax, castor oil wax and various synthetic waxes can be useful. Examples of heat stabilizers include lead and barium-cadmium-zinc systems. Other fillers include ground and precipitated calcium carbonate, ground silica, clays and talcs. Examples of wetting agents are polyethylene glycol derivatives.

EXAMPLE 1

Sealants With Varying Amounts of Paint Sludge

Six batches of sealants were prepared for the study. A half-pint can was used to prepare a hundred gram batch. First, 4.34 g of 1:1 mixture of thermoplastic resin and plasticizer was weighed into the can. This was previously prepared by mixing the two together on the top of a hot plate until a homogeneous mixture was formed. Then, 13 g of paint sludge, 25 g of calcium carbonate and 8 g of plasticizer were added and mixed for 4 minutes on the highest speed on a Sunbeam mixer while scraping down the can walls in between. (The mixer was a Sunbeam Mixmaster model #01440 hand mixer equipped with a modified mixing blade. The mixing blade was constructed with ¼ solid steel tubing, and consisted of a 4" shaft attached to a 2 inch square rectangular paddle.) Then 1.09 g dicyandiamide was added into the can and mixed for 1 minute. In a separate can tetrahydophthatic anhydride was dissolved with the plasticizer on top of a hot plate in a 0.33:4 ratio. Then 4.33 g of this solution was added into the batch and mixed for another 1 minute. Another 4.26 g of plasticizer and 0.17 g of anionic surfactant wetting agent were added and mixed again for 1 minute. At this point, the two copolymer resins were added, 20.7 g dispersion resin and 8.7 g blending resin, and mixed for 2 minutes on speed 4. Again, in a separate can, the liquid solution was made by mixing together for 1 minute on speed 4, 6.13 g of triacrylate adhesion promoter, 0.11 g cumene hydroperoxide, 0.68 g silane adhesion promoter, 5.43 g elastomeric modified liquid epoxy resin promoter and 0.68 g calcium organic thixotropic agent. The amounts of these ingredients in the formula was multiplied by 1.25 to allow some excess in the can. Then 10.41 g of this solution was weighed into the batch and mixed for another 1 minute on speed 4.

The first three sealants had increasing amounts of paint sludge added directly to the batch without any additional processing other than what has been indicated. The other three also had increasing amount of sludge, where sludge powder was added instead of the paint sludge. The sludge powder was made by mixing a calcium carbonate processing filler and paint sludge on speed 4 on the Sunbeam mixer for 5 minutes creating a well-dispersed sludge filler. Less calcium carbonate is used for formula #6 since there is not enough calcium carbonate in the formulation to make a 1:1 ratio. For all the batches, the amount of calcium carbonate removed is equal to the amount of paint sludge added. See data in tables 1—1 and 1-2.

TABLE 1-1

| | DIFFERENT LEVEL OF SLUDGE Formulations (%) | | | | | |
|---|---|---|---|---|---|---|
| Ingredients | 1 | 2 | 3 | 4 | 5 | 6 |
| Copolymer dispersion resin (1) | 20.70 | 20.70 | 20.70 | 20.70 | 20.70 | 20.70 |
| Copolymer blending resin (2) | 8.70 | 8.70 | 8.70 | 8.70 | 8.70 | 8.70 |
| Disodecyl phthalate plasticizer | 18.43 | 18.43 | 18.43 | 18.43 | 18.43 | 18.43 |
| Thermoplastic resin (3) | 2.17 | 2.17 | 2.17 | 2.17 | 2.17 | 2.17 |
| Triacrylate adhesion promoter (4) | 4.90 | 4.90 | 4.90 | 4.90 | 4.90 | 4.90 |
| Cumene hydroperoxide | 0.09 | 0.09 | 0.09 | 0.09 | 0.09 | 0.09 |
| Tetrahydrophthalic anhydride | 0.33 | 0.33 | 0.33 | 0.33 | 0.33 | 0.33 |
| Elastomeric modif. liquid epoxy resin promoter (5) | 4.34 | 4.34 | 4.34 | 4.34 | 4.34 | 4.34 |
| Silane adhesion promoter (6) | 0.54 | 0.54 | 0.54 | 0.54 | 0.54 | 0.54 |
| Calcium organic thixotropic agent (7) | 0.54 | 0.54 | 0.54 | 0.54 | 0.54 | 0.54 |

TABLE 1-1-continued

| | DIFFERENT LEVEL OF SLUDGE Formulations (%) | | | | | |
|---|---|---|---|---|---|---|
| Ingredients | 1 | 2 | 3 | 4 | 5 | 6 |
| Dicyandiamide (8) | 1.09 | 1.09 | 1.09 | 1.09 | 1.09 | 1.09 |
| Anionic surfactant Wetting agent (9) | 0.17 | 0.17 | 0.17 | 0.17 | 0.17 | 0.17 |
| Calcium carbonate (10) | 25.00 | 20.00 | 15.00 | — | — | — |
| Bulk paint sludge | 13.00 | 18.00 | 23.00 | — | — | — |
| Sludge powder from bulk paint sludge and | — | — | — | 13.0 | 18.00 | 23.00 |
| Calcium carbonate | — | — | — | 23.00 | 20.00 | 15.00 |
| | 100% | 100% | 100% | 100% | 100% | 100% |

(1) A Copolymer of vinyl chloride and vinyl acetate available from Huls Corp. as Vestolit E7091
(2) A Copolymer of vinyl chloride and dibutyl maleate available from the Goodyear Tire and Rubber Co. as Pliovic MC-85
(3) A hot applied vinyl acetate ethylene resin available from Quantum Chemical as Vynathene EY80031
(4) Available from CPS Chemical Co. Inc. as Ageflex TMPTA
(5) Available from Seegot as Heloxy WC-8005
(6) Available from Huls America, Inc. as CM-8550
(7) Available from Ashland Chemical Co. as Ircogel 903
(8) Available from Pacific Anchor Chemical Corp. as Amicure CG 1200
(9) Available from BYK Chemie USA as BYKW960
(10) Available from H. M. Royal as Hakuenka CC

TABLE 1-2

| | COMPARISON OF THE PHYSICAL PROPERTIES OF THE SEALANTS Formulations (%) | | | | | |
|---|---|---|---|---|---|---|
| | 1 | 2 | 3 | 4 | 5 | 6 |
| Adhesion Panel (1) | | | | | | |
| HD (2) | 10.00 | 9.50 | 9.50 | 6.00 | 8.00 | 10.00 |
| Galv (3) | 8.00 | 8.00 | 8.00 | 7.00 | 9.00 | 10.00 |
| CRS (4) | 8.50 | 7.00 | 9.50 | 6.00 | 6.00 | 8.50 |
| Shear Overlaps (5) | | | | | | |
| CRS/Galv psi | 369.00 | 301.00 | 271.00 | 360.00 | 295.00 | 269.00 |
| HD/HD psi | 354.00 | 325.00 | 282.00 | 363.00 | 289.00 | 222.00 |
| CRS % CR: | 57.00 | 73.00 | 87.00 | 47.00 | 73.00 | 98.00 |
| Galv % CF: | 98.00 | 100.00 | 100.00 | 98.00 | 93.00 | 100.00 |
| HD % CF: | 90.00 | 58.00 | 74.00 | 72.00 | 42.00 | 63.00 |
| Viscosity (Poise) (6) | 1368.00 | 1248.00 | 1128.00 | 1162.00 | 1128.00 | 1060.00 |

(1) The Test method involved the application and curing (for 20 minutes at 325 F.) of the sealant on various metal substrates followed by manually removing the sealant from the metal to determine the character of the adhesive bond. The panel is graded from 0 to 10, with 0 equivalent to no adhesion and 10 being the best adhesion possible. The best adhesion possible is when the sealant must be torn to remove it from the panel and a layer of sealant remains on the panel. This is called cohesive failure (CF).
(2) Available from Advanced Coating Technologies, Inc. (ACT) as APR 10260 hot dip galvanized panels.
(3) Available from ACT as APR 10220 galvaneal panels.
(4) Available from ACT as APR 10161 cold rolled steel panels.
(5) The Test method involved bonding two 1 × 4 inch strips together with sealant. A one-inch square overlap section was bonded together with the sealant and then pulled apart on a tensile testing machine at a rate of 2 inches per minute. The adhesive thickness was 0.030 inches. The force to pull the sample apart is recorded in pounds per square inch. The percent cohesive failure is also recorded.
(6) Measured on a Caster Severs Rheometer.

EXAMPLE 2

Sealants with Different Methods of Incorporating Paint Sludge

Six batches of sealants were prepared for this study. The sealants are prepared in the same manner as Example 1. The first and second batches used the method of adding the paint sludge directly into the batch without any additional processing other than what has been indicated. In the third and fourth batches a sludge powder was made by dispersing the paint sludge using processing fillers. Equal amounts of paint sludge and a calcium carbonate processing filler were mixed together on speed 4 on Sunbeam mixer for 5 minutes. And in the fifth and sixth batches a sludge powder was generated in-situ. A sludge powder was made in a half-pint can in the same manner as the third and fourth batches. This was generated as a first step in the process, and the remainder of the sealant was built on top of the sludge powder. See Tables 2-1 and 2—2.

TABLE 2-1

| | Formulations (%) | | | | | |
|---|---|---|---|---|---|---|
| Ingredients | 1 | 2 | 3 | 4 | 5 | 6 |
| Copolymer dispersion resin (1) | 20.70 | 20.70 | 20.70 | 20.70 | 20.70 | 20.70 |
| Copolymer blending resin (2) | 8.70 | 8.70 | 8.70 | 8.70 | 8.70 | 8.70 |
| Disodecyl phthalate plasticizer | 18.43 | 18.43 | 18.43 | 18.43 | 18.43 | 18.43 |
| Thermoplastic resin (3) | 2.17 | 2.17 | 2.17 | 2.17 | 2.17 | 2.17 |
| Triacrylate adhesion promoter (4) | 4.90 | 4.90 | 4.90 | 4.90 | 4.90 | 4.90 |
| Cumene hydroperoxide | 0.09 | 0.09 | 0.09 | 0.09 | 0.09 | 0.09 |
| Tetrahydrophthalic anhydride | 0.33 | 0.33 | 0.33 | 0.33 | 0.33 | 0.33 |
| Elastomeric modif. liquid epoxy | 4.34 | 4.34 | 4.34 | 4.34 | 4.34 | 4.34 |

TABLE 2-1-continued

| Ingredients | Formulations (%) | | | | | |
|---|---|---|---|---|---|---|
| | 1 | 2 | 3 | 4 | 5 | 6 |
| resin promoter (5) | | | | | | |
| Silane adhesion promoter (6) | 0.54 | 0.54 | 0.54 | 0.54 | 0.54 | 0.54 |
| Calcium organic thixotropic agent (7) | 0.54 | 0.54 | 0.54 | 0.54 | 0.54 | 0.54 |
| Dicyandiamide (8) | 1.09 | 1.09 | 1.09 | 1.09 | 1.09 | 1.09 |
| Anionic surfactant Wetting agent (9) | 0.17 | 0.17 | 0.17 | 0.17 | 0.17 | 0.17 |
| Calcium carbonate (10) | 25.00 | 25.00 | — | — | 25.00 | 25.00 |
| Bulk paint sludge | 13.00 | 13.00 | — | — | 13.00 | 13.00 |
| Sludge powder from bulk paint sludge and | — | — | 13.00 | 13.00 | — | — |
| Calcium carbonate | — | — | 25.00 | 25.00 | — | — |
| | 100% | 100% | 100% | 100% | 100% | 100% |

(1)–(10). See Table 1-1.

TABLE 2-2

| | 1 | 2 | 3 | 4 | 5 | 6 |
|---|---|---|---|---|---|---|
| Adhesion Panel (1) | | | | | | |
| HD (2) | 8.00 | 6.00 | 7.00 | 8.50 | 9.50 | 7.00 |
| Galv (3) | 8.00 | 8.00 | 6.00 | 8.00 | 8.00 | 6.00 |
| CRS (4) | 8.00 | 8.50 | 7.00 | 8.00 | 8.00 | 7.50 |
| Shear Overlaps (5) | | | | | | |
| CRS/Galv psi: | 353.00 | 360.00 | 335.00 | 327.00 | 336.00 | 340.00 |
| HD/HD psi: | 357.00 | 360.00 | 361.00 | 367.00 | 345.00 | 344.00 |
| CRS % CF: | 53.00 | 57.00 | 72.00 | 58.00 | 58.00 | 60.00 |
| Galv % CF: | 98.00 | 98.00 | 100.00 | 95.00 | 98.00 | 98.00 |
| HD % CF: | 78.00 | 72.00 | 65.00 | 70.00 | 82.00 | 64.00 |
| Viscosity (Poise) (6) | 1128.00 | 1043.00 | 992.00 | 1111.00 | 940.00 | 1060.00 |

(1)–(6). See Table 1-2.

EXAMPLE 3

Preparation of Sludge Powders from Different Processing Fillers

Wet detackified paint sludge was vacuum-filtered and pressed to remove the bulk of the water from the paint sludge in order to produce a concentrated paint sludge. This was accomplished using a Buchner funnel fixed to a vacuum flask which was connected to a water aspirator. The mass was also pressed with a spatula while in the funnel, to aid in water removal. The resulting material, a concentrated paint sludge, contained about 33% volatiles.

A small amount (about 20 grams) of concentrated paint sludge was weighed into half-pint cans. A processing filler was then added to the concentrated paint sludge and mixed on speed 4 on the Sunbeam mixer for 5 minutes. Different ratio of paint sludge to processing filler is used to maintain uniform dryness for all the resulting sludge powders.

| Kind of Filler | Ratio of Filler to Sludge |
|---|---|
| Calcium oxide | 1:1 |
| Calcium carbonate | 1:1 |
| Silica | 1:2 |
| Clay | 3:2 |
| Talc | 1:1 |
| Hydrated alumina | 1:1 |
| Wood flour | 2:3 |
| Pecan shells | 3:4 |
| Walnut shells | 3:4 |
| Poly soy | 5:6 |
| Cork | 1:1 |

A separate batch of sealant was prepared as in Example 1 for each type of processing filler. The slight differences in formulation were caused by the different amounts of plasticizer needed to maintain similar viscosities. See data in Table 3-1.

TABLE 3-1

| Ingredients | Formulations (%) | | | | | | | | | | |
|---|---|---|---|---|---|---|---|---|---|---|---|
| | 1 | 2 | 3 | 4 | 5 | 6 | 7 | 8 | 9 | 10 | 11 |
| Copolymer dispersion resin | 20.20 | 20.70 | 20.20 | 20.70 | 20.20 | 20.70 | 19.00 | 19.80 | 19.80 | 19.80 | 19.40 |
| Copolymer blending resin | 8.50 | 8.70 | 8.50 | 8.70 | 8.50 | 8.70 | 8.00 | 8.30 | 8.30 | 8.30 | 8.16 |
| Disodecyl phthalate plasticizer | 20.10 | 18.43 | 20.10 | 18.43 | 20.10 | 18.43 | 24.96 | 21.80 | 21.80 | 21.80 | 23.43 |
| Thermoplastic resin | 2.10 | 2.17 | 2.10 | 2.17 | 2.10 | 2.17 | 2.00 | 2.10 | 2.10 | 2.10 | 2.04 |
| Triacrylate adhesion promoter | 4.80 | 4.90 | 4.80 | 4.90 | 4.80 | 4.90 | 4.50 | 4.69 | 4.69 | 4.69 | 4.59 |
| Cumene hydroperoxide | 0.09 | 0.09 | 0.09 | 0.09 | 0.09 | 0.09 | 0.08 | 0.08 | 0.08 | 0.08 | 0.08 |
| Tetrahydrophthalic anhydride | 0.32 | 0.33 | 0.32 | 0.33 | 0.32 | 0.33 | 0.30 | 0.31 | 0.31 | 0.31 | 0.31 |
| Elastomeric modif. liquid resin promoter | 4.28 | 4.34 | 4.28 | 4.34 | 4.28 | 4.34 | 4.00 | 4.20 | 4.20 | 4.20 | 4.08 |
| Silane adhesion promoter | 0.54 | 0.54 | 0.54 | 0.54 | 0.54 | 0.54 | 0.50 | 0.52 | 0.52 | 0.52 | 0.51 |
| Calcium organic thixotropic agent | 0.54 | 0.54 | 0.54 | 0.54 | 0.54 | 0.54 | 0.50 | 0.52 | 0.52 | 0.52 | 0.51 |
| Dicyandiamide | 1.06 | 1.09 | 1.06 | 1.09 | 1.06 | 1.09 | 1.00 | 1.04 | 1.04 | 1.04 | 1.02 |
| Anionic surfactant wetting agent | 0.17 | 0.17 | 0.17 | 0.17 | 0.17 | 0.17 | 0.16 | 0.17 | 0.17 | 0.17 | 0.16 |
| Calcium carbonate filler | 11.70 | 25.00 | 18.10 | 5.40 | 11.70 | 12.00 | 15.00 | 14.60 | 14.60 | 13.54 | 11.22 |

TABLE 3-1-continued

| Ingredients | Formulations (%) | | | | | | | | | | |
|---|---|---|---|---|---|---|---|---|---|---|---|
| | 1 | 2 | 3 | 4 | 5 | 6 | 7 | 8 | 9 | 10 | 11 |
| Sludge | 12.80 | 13.00 | 12.80 | 13.00 | 12.80 | 13.00 | 12.00 | 12.50 | 12.50 | 12.50 | 12.25 |
| Calcium oxide | 12.80 | | | | | | | | | | |
| Silica | | | 6.40 | | | | | | | | |
| Clay | | | | 19.60 | | | | | | | |
| Talc | | | | | 12.80 | | | | | | |
| Hydrated alumina | | | | | | 13.00 | | | | | |
| Wood flour | | | | | | | 8.00 | | | | |
| Pecan shell | | | | | | | | 9.37 | | | |
| Walnut shell | | | | | | | | | 9.37 | | |
| Poly soy | | | | | | | | | | 10.43 | |
| Cork | | | | | | | | | | | 12.24 |
| Shear Overlaps | | | | | | | | | | | |
| HD/HD psi | 648.00 | 317.00 | 400.00 | 443.00 | 392.00 | 414.00 | 300.00 | 295.00 | 330.00 | 324.00 | 252.00 |
| CRS/Galv psi | 367.00 | 581.00 | 434.00 | 691.00 | 522.00 | 626.00 | 334.00 | 379.00 | 360.00 | 373.00 | 282.00 |
| HD % CF | 13.00 | 100.00 | 100.00 | 92.00 | 93.00 | 100.00 | 52.00 | 90.00 | 75.00 | 80.00 | 72.00 |
| CRS % CF | 78.00 | 47.00 | 82.00 | 93.00 | 97.00 | 68.00 | 13.00 | 25.00 | 32.00 | 57.00 | 43.00 |
| Galv % CF | 85.00 | 98.00 | 100.00 | 100.00 | 100.00 | 100.00 | 92.00 | 78.00 | 100.00 | 87.00 | 63.00 |
| Viscosity (Poise) | 1436.00 | 1197.00 | 1368.00 | 1368.00 | 1453.00 | 1316.00 | 1368.00 | 1026.00 | 1060.00 | 1146.00 | 1026.00 |

It will be obvious to those skilled in the art that various changes may be made without departing from the scope of the invention which is not to be considered limited to what is described in the specification.

What is claimed is:

1. A method of preparing a sealant composition with a paint sludge containing water, solvent, and uncured polymer resin comprising:
    generating a sludge powder containing uncured polymer by adding a processing filler to said paint sludge having a volatiles content of 0-50% by weight, and
    combining with said sludge powder a polymer, plasticizer, curative, an adhesion promoter and sealant filler materials to form a sealant composition.

2. The method of claim 1 wherein said processing filler is selected from the group consisting of calcium oxide, calcium sulfate, calcium chloride, magnesium sulfate, sodium sulfate, potassium carbonate, calcium carbonate, silica, clay, talc, hydrated alumina, wood flour, nut shells, poly soy, and cork.

3. The method of claim 2 wherein said polymer is at least in part a polyvinyl chloride resin.

4. A sealant composition produced by the method of claim 3.

5. The method of claim 1 wherein said sludge powder is generated in-situ.

6. The method of claim 1 wherein said sludge powder is first generated and, then, stored and later combined with said polymer, plasticizer, curative, and other sealant ingredients.

7. A sealant composition produced by the method of claim 1.

8. An in-situ method of preparing a sealant composition with a paint sludge containing water, solvent and uncured polymer resin comprising:
    providing a paint sludge containing uncured polymer and having a volatiles content of 0-50% by weight, and
    combining with said paint sludge a polymer, plasticizer, curative, an adhesion promotor and sealant filler material to form a sealant composition.

9. The method of claim 8 wherein said polymer is at least in part a polyvinyl chloride resin.

10. A sealant composition produced by the method of claim 9.

11. The method of claim 8 wherein said paint sludge is a detackified paint sludge.

12. The method of claim 8 wherein said paint sludge is a concentrated paint sludge.

13. A sealant composition produced by the method of claim 8.

* * * * *